United States Patent
Iwata

(10) Patent No.: US 6,865,621 B2
(45) Date of Patent: Mar. 8, 2005

(54) ACTIVATING AN OPERATING SYSTEM OF A COMPUTER IN RESPONSE TO AN OPERATION OF POWER SWITCH OF A MEDIUM DRIVE WITHOUT TURNED ON A MAIN SWITCH OF THE COMPUTER

(75) Inventor: Takeshi Iwata, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 287 days.

(21) Appl. No.: 09/803,025

(22) Filed: Mar. 12, 2001

(65) Prior Publication Data

US 2001/0056509 A1 Dec. 27, 2001

(30) Foreign Application Priority Data

Jun. 16, 2000 (JP) ........................................ 2000-181917

(51) Int. Cl.[7] .................................................. G06F 3/00
(52) U.S. Cl. ............................ 710/20; 710/21; 710/14; 710/7; 710/48; 713/1; 713/300; 713/324
(58) Field of Search ........................... 710/8–14, 7, 20, 710/21, 48; 713/1, 2, 300–340

(56) References Cited

U.S. PATENT DOCUMENTS

| | | | | |
|---|---|---|---|---|
| 5,987,537 A | | 11/1999 | Brainard et al. | |
| 6,006,285 A | * | 12/1999 | Jacobs et al. | 710/14 |
| 6,006,337 A | * | 12/1999 | Koo | 713/324 |
| 6,038,672 A | * | 3/2000 | Klein | 713/322 |
| 6,073,187 A | | 6/2000 | Jacobs et al. | |
| 6,226,237 B1 | * | 5/2001 | Chan et al. | 710/14 |
| 6,349,386 B1 | * | 2/2002 | Chan | 713/323 |
| 6,414,675 B1 | * | 7/2002 | Shen | 345/211 |

FOREIGN PATENT DOCUMENTS

| | | | | |
|---|---|---|---|---|
| EP | 0 933 701 A2 | | 8/1999 | |
| JP | 10-143984 | | 5/1998 | G11B/19/12 |
| JP | 11-134078 | * | 5/1999 | |
| JP | 2000-3233 | | 1/2000 | G06F/1/26 |
| JP | 2000-21143 | | 1/2000 | G11B/31/00 |
| JP | 2001351309 | * | 12/2001 | |

* cited by examiner

Primary Examiner—Jeffrey Gaffin
Assistant Examiner—Mike Nguyen
(74) Attorney, Agent, or Firm—Finnegan, Henderson, Farabow, Garrett, & Dunner, L.L.P.

(57) ABSTRACT

A computer comprises a medium drive configured to reproduce data recorded in a video recording medium and an audio recording medium. When a reproduction switch is turned on if the computer is not powered, it is determined whether the video recording medium or the audio recording medium is loaded. If the video recording medium is loaded, the operating system is activated and the reproduction application is also activated.

13 Claims, 4 Drawing Sheets

ACTIVATING AN OPERATING SYSTEM OF A COMPUTER IN RESPONSE TO AN OPERATION OF POWER SWITCH OF A MEDIUM DRIVE WITHOUT TURNED ON A MAIN SWITCH OF THE COMPUTER

CROSS-REFERENCE TO RELATED APPLICATIONS

This application is based upon and claims the benefit of priority from the prior Japanese Patent Application No. 2000-181917, filed Jun. 16, 2000, the entire contents of which are incorporated herein by reference.

BACKGROUND OF THE INVENTION

Personal computers having an audio CD reproduction function have been marketed in recent years. Some of such personal computers are provided with operation switches dedicated to reproducing a CD for the purpose of improving convenience of the computer user when the computer is used simply as a CD player.

For instance, in the case of a laptop type portable computer of the type under consideration, a power switch, a fast backward button, a fast forward button, a reproduction button and a stop button are arranged on the front surface of the computer cabinet so that the CD reproduction may be performed when the display panel is closed. The power controller can control the CD drive independently from controlling the computer main body so that the power source of the CD drive can be controlled by operating the power switch dedicated to the CD reproduction function.

Then, with such a personal computer, the user can reproduce a CD by turning on the power switch dedicated to the CD reproduction function, drawing out the CD tray, putting the CD on the tray, pushing back the CD tray into the computer cabinet and depressing the reproduction button. Therefore, the user is not required to turn on the power switch of the computer main body to activate the operating system (to be referred to as OS hereinafter) and hence can quickly start reproducing the CD.

Meanwhile, video CDs and DVDs technologically compatible with the current audio CD standards have become popular in recent years as video recording media. Music CDs will be referred to simply as CDs hereinafter. In line this trend, personal computers comprising a disk drive driving a CD, a video CD, or a DVD have been marketed.

However, while known personal computers comprising operation switches dedicated to reproducing a CD can be used to reproduce a CD without turning on the power switch of the computer main body, they are not adapted to reproducing a DVD or a CD without turning on the power switch of the computer main body. This is because the use of a specifically designed application program is required to reproduce such a video recording medium. In other words, when reproducing such a recording medium by means of a personal computer of the type under consideration, it is necessary for the user to firstly turn on the power switch of the computer main body to activate the operating system of the computer and then activate the application program for reproducing a video recording medium.

However, as the power switch of the computer main body is turned on to activate the OS of the computer, all the devices of the computer including those required to reproduce the video recording medium are activated (and initialized) to waste power and time to a certain extent.

It may be appreciated that the same is true when activating a specific application program or a function other than the application program or the function for reproducing a recording medium.

As described above, the power switch of the computer main body has to be turned on to activate the OS and supply power to all the devices of the computer so as to consequently waste power and time to a certain extent when the user wants to activate only a specific application program or a function (and hence supply power to specific devices). For instance, while it is possible to reproduce an audio recording medium only by turning on the power switch of the medium drive and depressing the reproduction button, it is not possible to reproduce a video recording medium without turning on the power switch of the computer main body and activating the OS of the computer.

BRIEF SUMMARY OF THE INVENTION

Accordingly, the present invention is directed to a computer that substantially obviates one or more of the problems due to limitations and disadvantages of the related art.

Another object of the present invention is to provide a personal computer with which a specific application program or a specific function of the computer can be activated within a short period of time.

A related object of the present invention is to provide a personal computer having a function of reproducing a recording medium and adapted to optimally operate for the selected recording medium in terms of consumption of time and power, selecting the optimum process for activating the application program or the function to be used for reproducing the recording medium.

A further object of the present invention is to provide a personal computer activating an application program in a short period of time without activating the OS of the computer if the application program does not require activation of the OS of the computer.

According to the present invention, there is provided a computer comprising a medium drive; a power switch of the medium drive; and a controller configured to activate an operating system of the computer in response to an operation of the power switch.

According to the present invention, there is provided another computer comprising a medium drive, having a reproduction switch, configured to reproduce data recorded in a recording medium; a power switch of the medium drive; a determination unit configured to determine the type of the recording medium in response to an operation of the power switch; and a controller configured to, in response to an operation of the reproduction switch, issue a reproduction command to the medium drive if it is determined that the recording medium is an audio recording medium, and activate an operating system of the computer and a video reproduction software if it is determined that the recording medium is a video recording medium.

According to the present invention, there is provided a further computer comprising a medium drive configured to reproduce data recorded in a recording medium; a power switch of the medium drive; and a controller configured to determine a type of the recording medium in response to an operation of the power switch and perform a reproduction operation in accordance with the determined type.

According to the present invention, there is provided a still another computer comprising a memory configured to store a specific software adapted to be activated without activating an operating system of the computer; an operation switch configured to activate the specific software; and a controller configured to activate the specific software in response to the an operation of the operation switch even if the computer is not powered.

According to the present invention, there is provided a still further computer comprising a first power switch; a second power switch; a controller configured to, if the operating system is not activated, activate an operating system of the computer and set an operation mode of the computer to a first operation mode which executes a first predetermined function in response to an operation of the first power switch, and activate the operating system of the computer and set the operation mode to a second operation mode which executes a second predetermined function in response to an operation of the second power switch.

According to the present invention, there is provided a still further computer comprising a power switch of the computer; an activation switch of a specific function; and a controller configured to identify either the power switch or the activation switch which is operated in the computer is not powered, activate an operating system of the computer in response to an operation of the power switch, and supply power to devices relating to the specific function in response to an operation of the activation switch.

According to the present invention, there is provided a method of activating a computer which comprises a first power switch of the computer, a second power switch of a specific device, and an activation switch of a specific software, the method comprising determining which switch is operated; activating an operating system of the computer if it is determined that the first power switch is operated; supplying power to the specific device if it is determined that the second power switch is operated; and activating the specific software without activating the operating system if it is determined that the activation switch is operated.

According to the present invention, there is provided another method of activating a computer which comprises a medium drive configured to reproduce data recorded in a recording medium, a power switch of the medium drive and a reproduction switch, the method comprising supplying power to the medium drive in response to an operation of the power switch and determining a type of the recording medium; issuing a reproduction command to the medium drive in response to an operation of the reproduction switch if it is determined that the recording medium is an audio recording medium; and activating an operating system of the computer if it is determined that the recording medium is a video recording medium and activating a video reproduction software in response to the operation of the reproduction switch.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1:
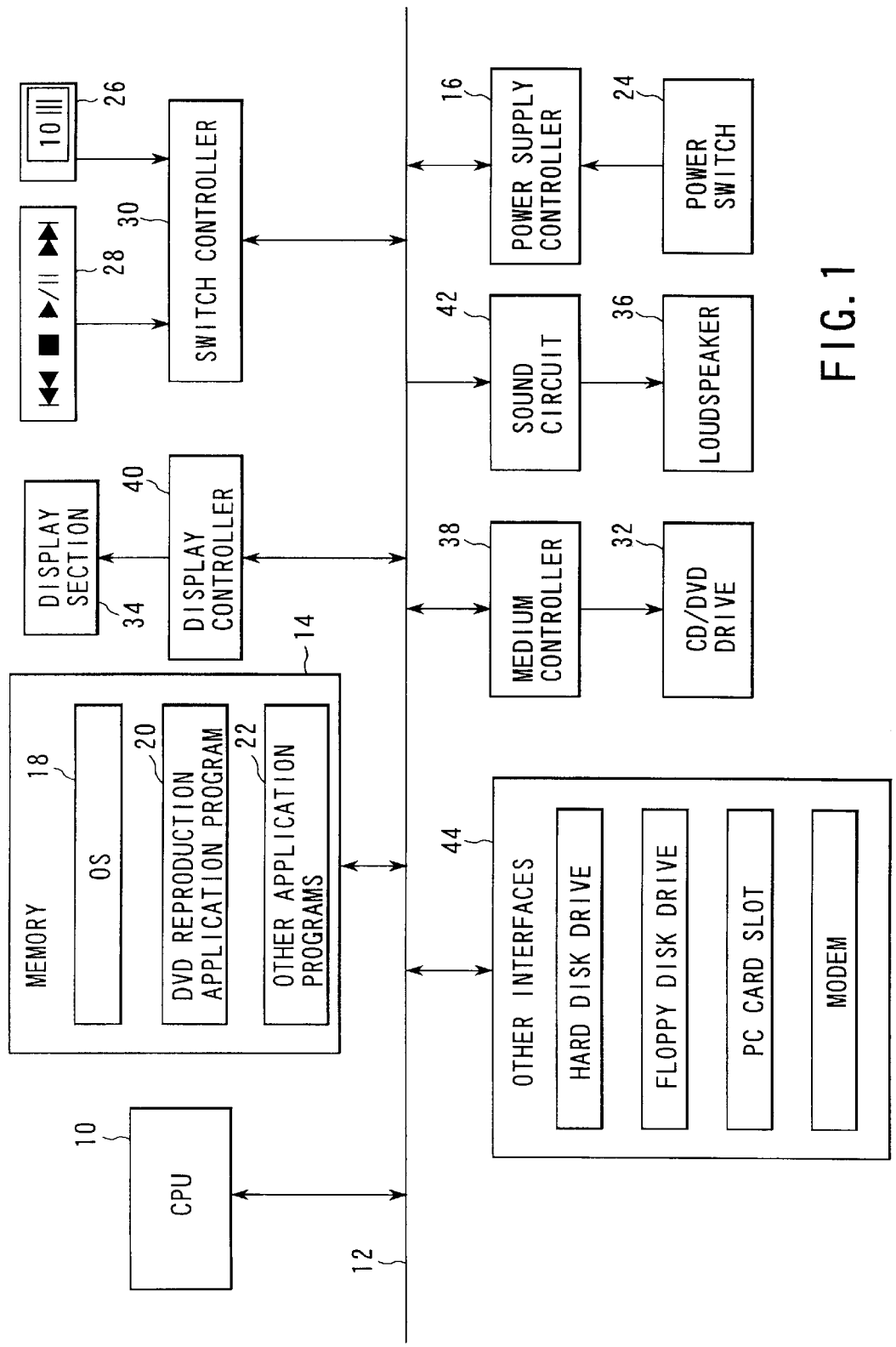
FIG. 1 is a schematic block diagram of a first embodiment of a computer according to the present invention, showing its system configuration.

A preferred embodiment of a computer according to the present invention will now be described with reference to the accompanying drawings. FIG. 1 is a schematic block diagram of the first embodiment of the computer according to the present invention, showing its system configuration.

A memory 14 and power supply controller 16 are connected to a bus line 12 of a CPU 10. The memory 14 stores an OS 18, DVD reproduction application program 20, and other application programs 22. The computer is equipped with a pair of power supply switches including a first power supply switch (to be referred to as main switch hereinafter) 24 for the computer main body and a second power supply switch (to be referred to as drive switch hereinafter) 26 to be used exclusively for the recording medium drive. When the main switch 24 is turned on, the operating system is started and initialized. The main switch 24 is a push button switch whereas the drive switch 26 is a sliding switch. The main switch 24 is connected to the power controller 16. Along with other operation switches 28 including a backward skip switch, a stop switch, a reproduction switch, and a forward skip switch, the drive switch 26 is connected to the bus line 12 by way of a switch controller 30.

If the embodiment is a laptop computer, the drive switch 26 and the operation switches 28 are arranged on the front surface of the computer cabinet so that they may be operated when the display panel is closed. While the power supply controller 16 and the switch controller 30 are realized as separate components in this embodiment, they may alternatively be formed by a same 1-chip microprocessor.

The computer further comprises a CD/DVD drive 32, a display device (e.g., LCD) 34 and a loudspeaker 36 for reproducing a recording medium, which are also connected to the bus line 12 respectively by way of a medium controller 38, a display controller 40, and a sound circuit 42. While the computer also comprises a hard disk drive, a floppy disk drive, a PC card slot and a modem like an ordinary personal computer, they are collectively indicated as other interfaces 44 that are connected to the bus line 12 in FIG. 1 because they are not directly related to the present invention.

Figure 2:
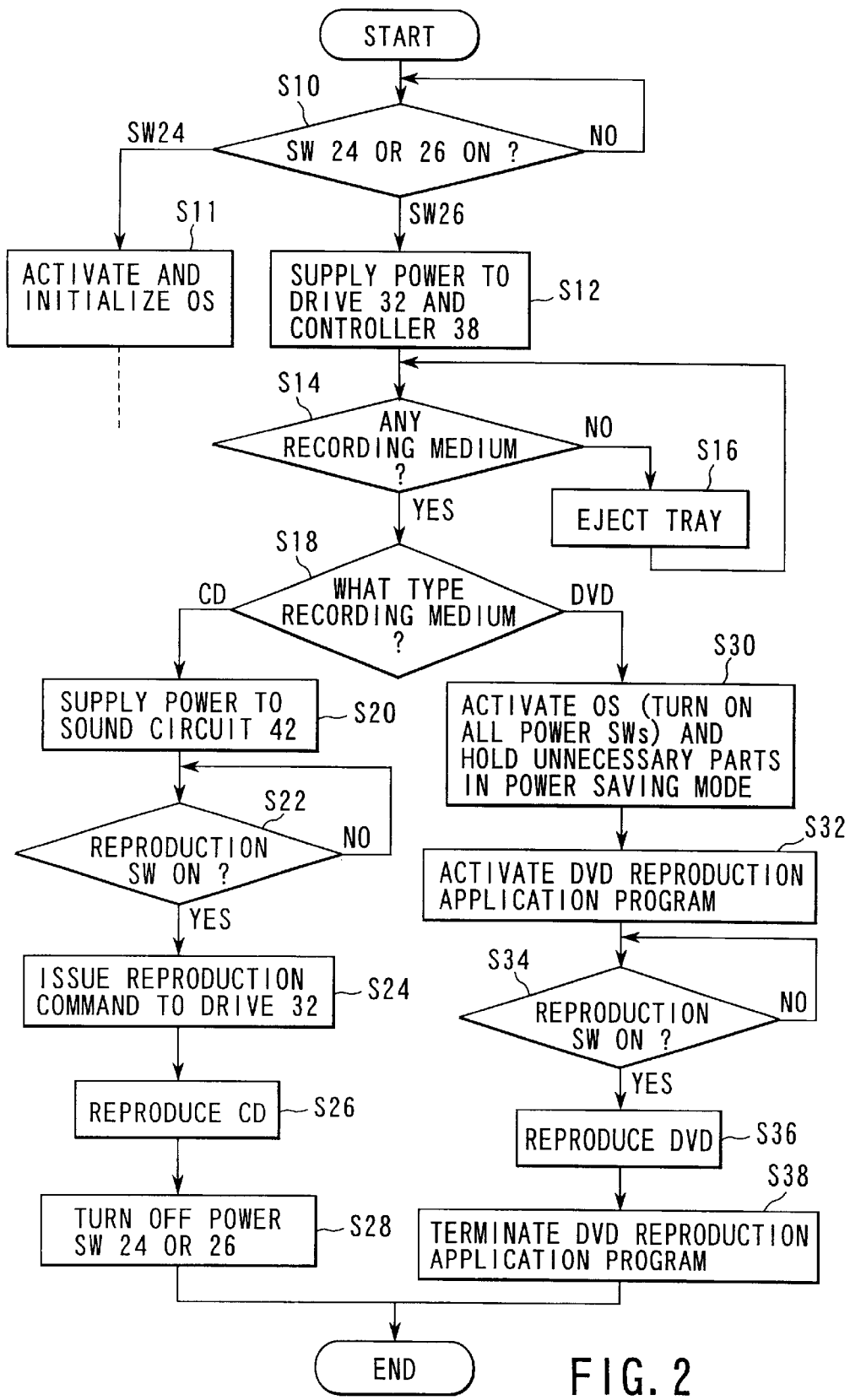
FIG. 2 is a flow chart of the operation of reproducing a recording medium of the first embodiment.

Now, the operation of this embodiment for reproducing a recording medium will be described by referring to the flow chart of FIG. 2. Firstly, in step S10, it is determined if the main switch 24 or the drive switch 26 is turned on or not. If the main switch 24 is turned on, the operation proceeds to step S11, where the OS is activated by a signal from the power supply controller 16 to initialize the computer.

If, however, the medium drive switch 26 is turned on, the operation proceeds to step S12, where the CD/DVD drive 32 and the medium controller 38 are powered by the power supply controller 16. Note that the power supply controller 16, switch controller 30, medium drive switch 26, and operation switches 28 are active even if the main switch 24 is not turned on. In step S14, the medium controller 38 determines if the drive 32 is loaded with a recording medium or not. If the drive 32 is not loaded with a recording medium yet, the medium controller 38 ejects the tray and prompts the user to load the tray with a recording medium in step S16.

If the tray is loaded with a recording medium, the operation proceeds to step S18, where it is determined if the loaded recording medium is an audio recording medium (e.g., CD) that does not require the reproduction application program to be activated or a video recording medium (e.g., DVD) that requires the reproduction application program to be activated.

If it is determined that the recording medium is a CD, the operation proceeds to step S20, where the power supply controller 16 supplies power to the sound circuit 42. If it is detected in step S22 that the reproduction switch is operated, the medium controller 38 issues a reproduction command to the CD/DVD drive 32 in step S24. Upon receiving the command, the CD/DVD drive 32 reproduces the CD in step S26. The reproduction of the CD continues until the drive switch 26 is turned off in step S28, although it will be appreciated that the reproduction of the CD is stopped when the main switch 24 is turned off or the stop switch included in the operation switches 28 is turned on.

If, however, it is determined that the recording medium is a DVD, the operation proceeds to step S30, where the power supply controller 16 supplies power to the CPU 10 to activate the OS. When the OS is activated, power is supplied to all the devices of the computer. Subsequently, the devices that are not used for reproducing the DVD (e.g., the other interfaces 44) are put into a power saving mode. Then, in step S32, the DVD reproduction application is activated and, if it is detected in step S34 that the reproduction switch is operated, the DVD is reproduced in step S36. The reproduction of the DVD continues until the DVD reproduction application is terminated in step S38 regardless if the drive switch 26 is moved to power off position ("0" position). The reproduction of the DVD is stopped when the main switch 24 is turned off.

As described above, with this embodiment, the recording medium drive 32 is supplied with power when the drive switch 26 dedicated to the recording medium drive 32 is turned on even if the main switch 24 of the computer main body is held off (and hence the CPU 10 is also off). Then, if the recording medium drive 32 is loaded with a CD, the CD is reproduced when the reproduction switch is turned on and a reproduction command is issued to the recording medium drive 32.

If, however, the recording medium drive 32 is loaded with a DVD, the medium switch 26 is turned on to activate the OS but the devices that are not used for reproducing the DVD are put into a power saving mode. Then, when the reproduction switch is turned on, the DVD reproduction application is activated and the DVD is reproduced.

While the OS is activated and all the devices of the computer are supplied with power before those devices that are not used for reproducing the DVD are put into a power saving mode in the above description, if possible, it may alternatively be so arranged that power is supplied selectively only to the devices that are used for reproducing the DVD after activating the OS.

Other embodiments of the computer according to the present invention will be described. The same portions as those of the first embodiment will be indicated in the same reference numerals and their detailed description will be omitted.

While the first embodiment is described above in terms of the specific function of reproducing a recording medium, this second embodiment will be described in terms of a specific application program that is activated to activating a specific function.

Figure 3:
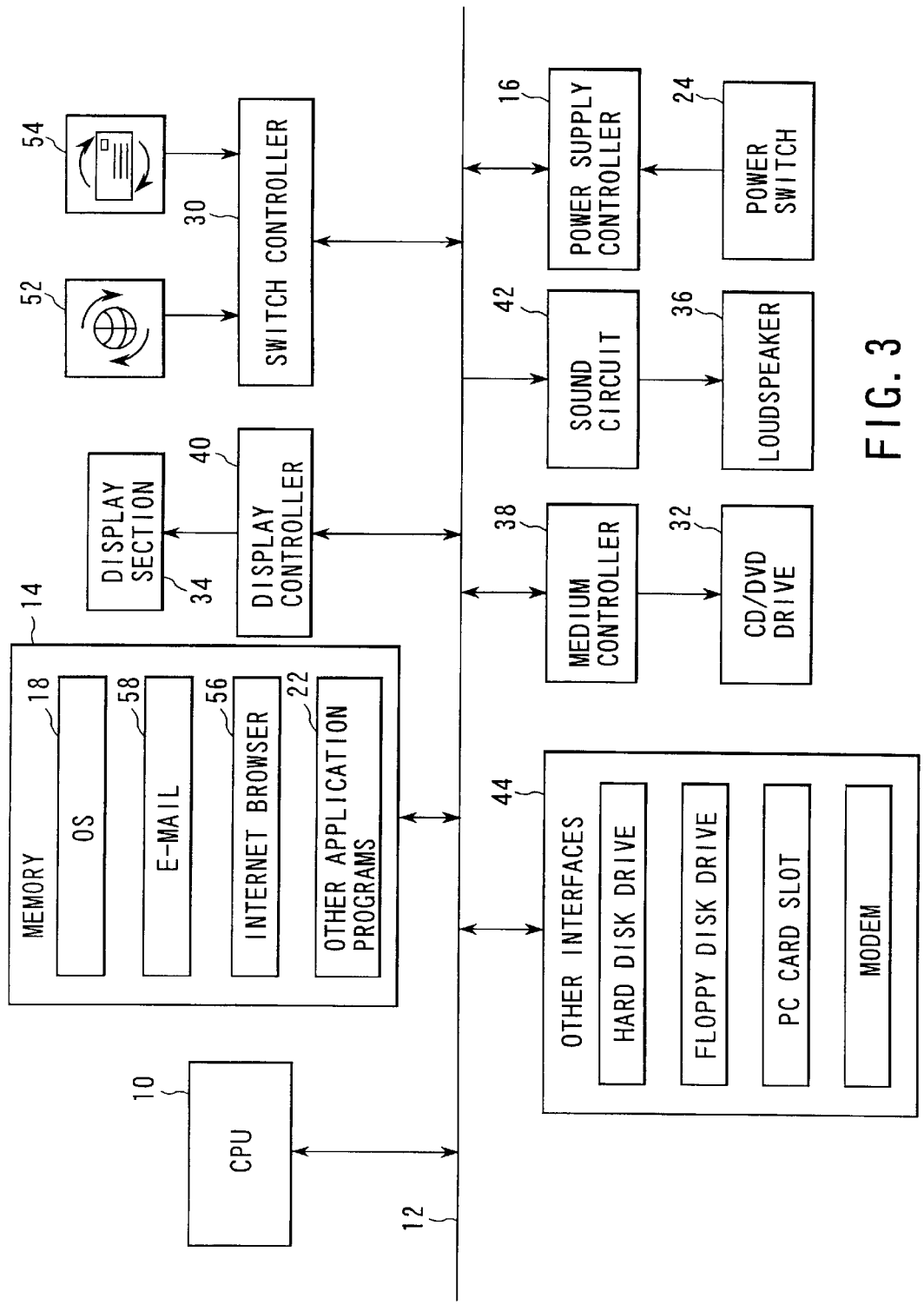
FIG. 3 is a schematic block diagram of a second embodiment of a computer according to the present invention, showing its system configuration.

FIG. 3 is a schematic block diagram of the second embodiment of the computer according to the invention, showing its system configuration. The medium switch 26 and the operation switch 28 of the first embodiment are replaced by a pair of specific application program activation switches 52 and 54, which are connected to the bus line 12 by way of the switch controller 30. To be more accurate, the activation switches 52 and 54 are designed respectively to activate an Internet browser application program and an E-mail application program. Each of these application programs has its own ILP (initial program loader) and hence can activate itself without activating the OS. The memory 14 stores the Internet browser application program 56 and the E-mail application program 58. Otherwise, the second embodiment is identical with the first embodiment.

Figure 4:
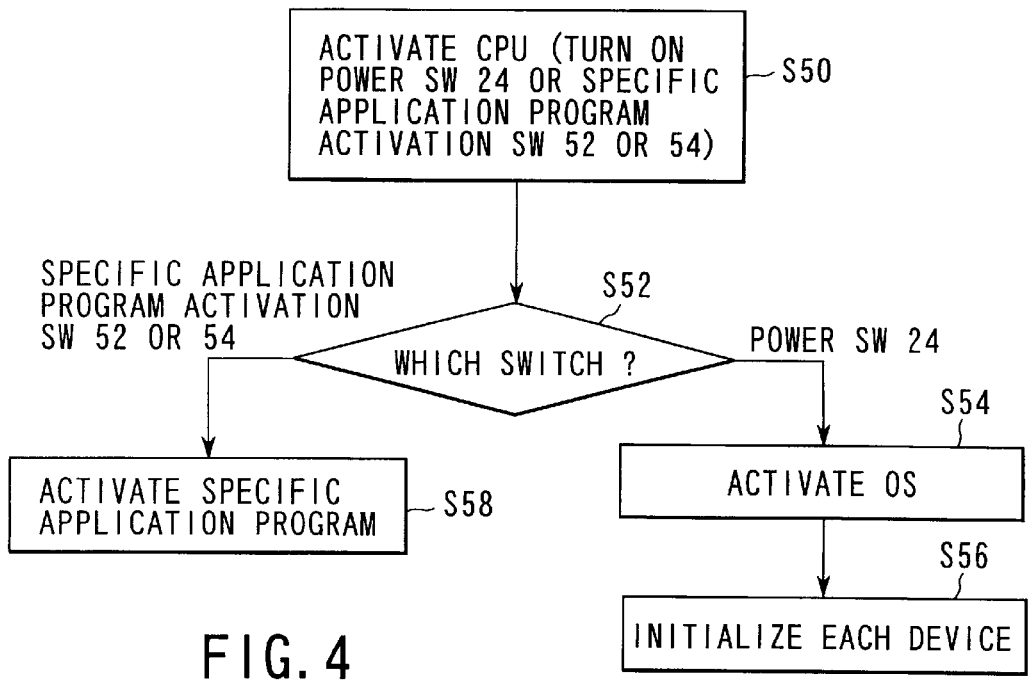
FIG. 4 is a flow chart of the operation of reproducing a recording medium of the second embodiment.

Now, the operation of the second embodiment will be described by referring to the flow chart of FIG. 4. Firstly, when the main switch 24 or either of the specific application program activation switch 52 or 54 is turned on in step S50 while the computer main body is kept turned off, the power supply controller 16 supplies power to the CPU 10. Then, in step S52, the CPU 10 determines that which switch is turned on to supply power to the CPU 10. If it is determined that the main switch 24 is turned on, the OS is activated in step S54 and the devices are supplied with power and initialized in step S56 like an ordinary computer.

If, however, either of the specific application program activation switch 52 or 54 is turned on, the specific application program related to the switch that is turned on (the E-mail application program 58 or the Internet browser application program 56) is activated without activating the OS in step S58. Note that, in step S58, only the devices that are necessary for executing the specific application program are supplied with power, while all the devices that are not necessary for executing the specific application program remain inactive.

As described above, in this embodiment, a specific application programs that does not require the operating system of the computer to be activated is activated in a short period of time simply by turning on the dedicated activation switch without turning on the power supply switch of the computer main body and activating the operation system. Further, the devices that are not related to the application program are not supplied with power because the operating system is not activated so that power is not wasted in this embodiment.

Now, the third embodiment of the present invention that is realized by combining the specific function of the first embodiment and that of the second embodiment will be described. Since this embodiment is realized by adding the unique function (namely the specific application program activation switches 52 and 54) to the configuration of FIG. 1, no block diagram will be specifically illustrated for the third embodiment.

Figure 5:
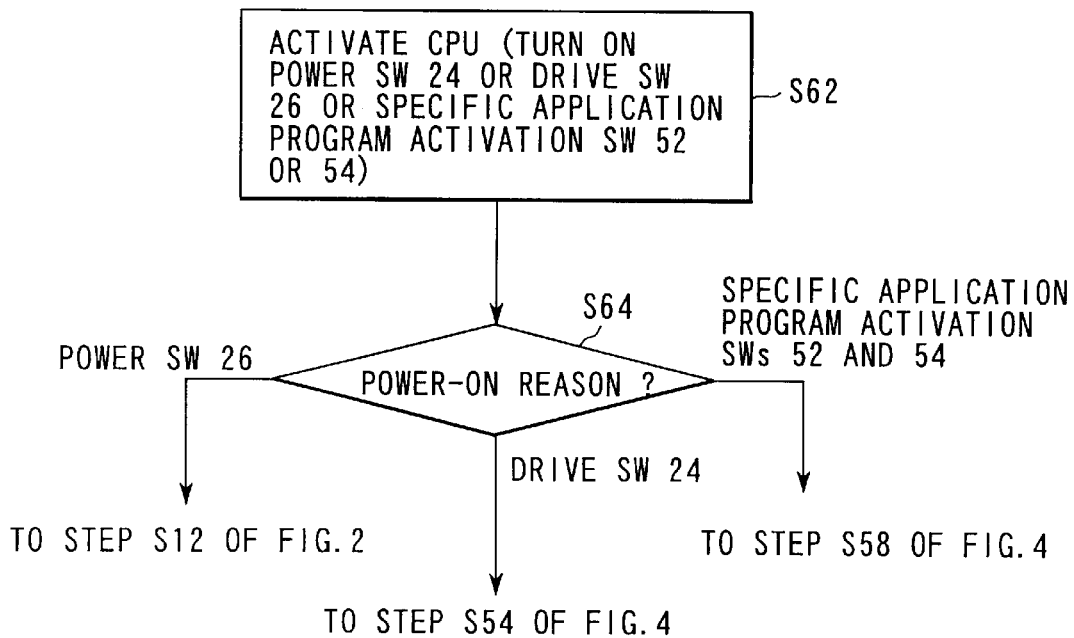
FIG. 5 is a flow chart of the operation of a third embodiment of a computer according to the present invention.

The operation of the third embodiment will be briefly described below by referring to FIG. 5. Firstly, when the main switch 24, the drive switch 26, or either of the specific application program activation switch 52 or 54 is turned on in step S62 while the computer main body is kept turned off, the power supply controller 16 supplies power to the CPU 10. Then, in step S64, the CPU 10 determines that which switch is turned on to supply power to the CPU 10. If it is determined that the drive switch 26 is turned on, the operation of turning on the switch 26 is same as that of step S10 of the first embodiment and, therefore, the processing operations from step S12 on in FIG. 2 are performed. If it is determined that the main switch 24 is turned on, the processing operation of step S54 of the second embodiment is performed to activate the OS as shown in FIG. 4. Finally, if it is determined that either of the specific application program activation switch 52 or 54 is turned on, the specific application program related to the switch that is turned on is activated without activating the OS in step S58.

Thus, when the above switches other than the power supply switch of the computer main body are turned on, only the application program and/or the devices related to the switch are activated in a short period of time without wasting power if they does not require the OS to be activated first.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For example, while the DVD reproduction application program of the first embodiment requires activation of the OS to activate itself, it may be replaced by an application program that does not requires activation of the OS like either of the specific application programs of the second embodiment to make it possible to start reproducing a DVD in a shorter period of time.

Similarly, while the drive switch 26 is required to be operated in the first embodiment, it may alternatively be so arranged that, if a recording medium is loaded on the tray, the drive 32 is automatically supplied with power to start reproducing the recording medium simply by depressing the reproduction switch 28 even through the main switch 24 of the computer main body is kept turned off.

It may furthermore be so arranged that the drive 32 is automatically supplied with power simply by depressing the eject button to eject the tray, put a disk on it and push back the tray and subsequently depressing the reproduction button even though the main switch 24 of the computer main body is held off.

Furthermore, the above described embodiments contains various inventions of different levels that may be extracted by combining the plurality of disclosed requirements of the invention. For instance, if some of the requirements of the above described embodiments are omitted, an invention may be extracted if the remaining requirements are met to dissolve at least one of the problems that are listed above as those to be solved by the present invention and provide at least one of the advantages as listed below.

According to the present invention, the devices that need to be used to reproduce a recording medium are supplied with power or the specific application program that needs to be used to reproduce a recording medium is activated to eliminate waste of time simply by operating the power supply switch of the recording medium drive or the switch for activating the specific application program, whichever appropriate. Since the type of the recording medium is determined and the corresponding function of a computer according to determined type is activated, the computer that is adapted to reproduce a recording medium can be optimally operated so that a video recording medium can be reproduced simply by operating a recording medium reproduction switch just like an audio recording medium although conventional computers of the type under consideration are not provided with such a function. Since a computer according to the invention can be provided with a switch dedicated to activate a specific application program without activating the OS and supply power to the CPU without using the power supply switch of the computer main body, application programs that do not require activation of the OS can be activated within a short period of time without activating the OS.

What is claimed is:

1. A computer comprising:
   a main switch of the computer;
   a medium drive;
   a power switch of the medium drive; and
   a controller configured to activate an operating system of the computer in response to a change of the power switch from off to on when the main switch is off.

2. A computer comprising:
   a main switch of the computer;
   a medium drive;
   a power switch of the medium drive; and
   a controller configured to activate an operating system of the computer in response to an operation of the power switch when the main switch is off wherein said medium drive reproduces data recorded in a video recording medium, and said controller activates a video reproduction software after activating the operating system.

3. A computer comprising:
   a main switch of the computer system;
   a medium drive, having a reproduction switch, configured to reproduce data recorded in a recording medium;
   a power switch of the medium drive;
   a determination unit configured to determine the type of the recording medium in response to an operation of the power switch when the main switch is turned off; and
   a controller configured to issue a reproduction command to said medium drive in response to an operation of the reproduction switch when it is determined that the recording medium is an audio recording medium, and activate an operating system of the computer and a video reproduction software when it is determined that the recording medium is a video recording medium.

4. The computer according to claim 3, wherein said controller deactivates said video reproduction software when the computer is turned off.

5. The computer according to claim 3, wherein said controller supplies power only to devices designed to reproduce the audio recording medium when it is determined that the recording medium is the audio recording medium.

6. The computer according to claim 3, wherein said controller, when it is determined that the recording medium is the video recording medium, supplies power to first devices designed to reproduce the video recording medium and second devices designed not to reproduce the video recording medium, and sets said second devices in a power-saving state.

7. A computer comprising:
   a power switch of the computer;
   an activation switch for a specific function;

a controller, which is operated when the computer is not powered, configured to identify either said power switch or said activation switch, activate an operating system of the computer in response to an operation of said power switch, and supply power to devices relating to the specific function in response to an operation of said activation switch; and a medium drive configured to reproduce an audio recording medium and a video recording medium, and wherein said activation switch includes a medium drive power switch and a reproduction switch, and said controller is configured to:

determine a type of the recording medium, if it is determined that the recording medium is the audio recording medium;

issue a reproduction command to said medium drive in response to an operation of the reproduction switch, when it is determined that the recording medium is the video recording medium;

activate the operating system of the computer, and activate a video reproduction software in response to the operation of said reproduction switch.

8. The computer according to claim 7, wherein said controller activates the operating system and supplies power to all devices of the computer in response to an operation of said activation switch, and then sets devices other than devices relating to the specific function to a power-saving mode.

9. The computer according to claim 7, further comprising a memory configured to store a specific software which is activated without activating the operating system, and wherein said activation switch includes a specific software activation switch, and said controller is configured to activate said specific software in response to an operation of said specific software activation switch without activating the operating system.

10. A computer comprising:

a power switch of the computer;

an activation switch for a specific function; and a controller, which is operated when the computer is not powered, configured to:

identify either said power switch or said activation switch;

activate an operating system of the computer in response to an operation of said power switch;

and supply power only to devices relating to the specific function in response to an operation of said activation switch.

11. The computer according to claim 10, wherein said controller activates the operating system and supplies power to all devices of the computer in response to an operation of said activation switch, and then sets devices other than devices relating to the specific function to a power-saving mode.

12. The computer according to claim 10, further comprising a medium drive configured to reproduce an audio recording medium and a video recording medium, and wherein said activation switch includes a medium drive power switch and a reproduction switch, and said controller is configured to:

determine a type of the recording medium, if it is determined that the recording medium is the audio recording medium;

issue a reproduction command to said medium drive in response to an operation of the reproduction switch, if it is determined that the recording medium is the video recording medium;

activate an operating system of the computer;

and activate a video reproduction software in response to the operation of said reproduction switch.

13. The computer according to claim 10, further comprising a memory configured to store a specific software which is activated without activating the operating system, and wherein said activation switch includes a specific software activation switch, and said controller is configured to activate said specific software in response to an operation of said specific software activation switch without activating the operating system.

* * * * *

UNITED STATES PATENT AND TRADEMARK OFFICE
CERTIFICATE OF CORRECTION

PATENT NO. : 6,865,621 B2
DATED : March 8, 2005
INVENTOR(S) : Iwata

It is certified that error appears in the above-identified patent and that said Letters Patent is hereby corrected as shown below:

Column 8,
Lines 18 and 25, change "a power switch of the medium drive; and" to -- a medium drive power switch;
an operating system; and --.
Lines 19, 26 and 45, change "an" to -- the --.
Lines 19 and 26, delete "of".
Lines 20 and 27, delete "the computer".
Lines 20, 27 and 40, change "power" to -- medium drive power --.
Line 28, change "off" to -- off, --.
Line 37, change "a power switch of the medium drive;" to -- a medium drive power switch; an operating system; --.
Line 40, delete "turned".
Line 45, delete "of the computer".
After line 64, insert: -- an operating system; --.

Column 9,
Line 3, change "an" to -- the --.

Signed and Sealed this

Twenty-eighth Day of June, 2005

JON W. DUDAS
*Director of the United States Patent and Trademark Office*